(12) United States Patent
Fradet et al.

(10) Patent No.: US 10,579,889 B2
(45) Date of Patent: Mar. 3, 2020

(54) VERIFICATION WITH ERROR TOLERANCE FOR SECURE PRODUCT IDENTIFIERS

(71) Applicant: INEXTO SA, Lausanne (CH)

(72) Inventors: Erwan Fradet, Grandvaux (CH); Philippe Chatelain, Chavornay (CH); Patrick Chanez, Cheyres (CH)

(73) Assignee: Inexto SA, Lausanne (CH)

( * ) Notice: Subject to any disclaimer, the term of this patent is extended or adjusted under 35 U.S.C. 154(b) by 96 days.

(21) Appl. No.: 15/753,548

(22) PCT Filed: Aug. 25, 2016

(86) PCT No.: PCT/EP2016/070138
§ 371 (c)(1),
(2) Date: Feb. 20, 2018

(87) PCT Pub. No.: WO2017/032861
PCT Pub. Date: Mar. 2, 2017

(65) Prior Publication Data
US 2018/0239980 A1    Aug. 23, 2018

Related U.S. Application Data

(60) Provisional application No. 62/209,798, filed on Aug. 25, 2015.

(51) Int. Cl.
*G06K 9/03* (2006.01)
*G06F 21/46* (2013.01)
(Continued)

(52) U.S. Cl.
CPC ............... *G06K 9/03* (2013.01); *G06F 21/31* (2013.01); *G06F 21/46* (2013.01); *G06K 9/6215* (2013.01); *G06K 2209/01* (2013.01)

(58) Field of Classification Search
CPC ........... G06F 21/31; G06F 21/46; G06K 9/03; G06K 9/6215; G06K 2209/01
See application file for complete search history.

(56) References Cited

U.S. PATENT DOCUMENTS

| 4,035,615 A | 7/1977 | Best et al. |
| 4,094,244 A | 6/1978 | Edwards et al. |

(Continued)

FOREIGN PATENT DOCUMENTS

| CN | 101354753 | 1/2009 |
| CN | 101609626 | 12/2009 |

(Continued)

OTHER PUBLICATIONS

"Best Compression algorithm for a sequence of integers", Nov. 12, 2008, Stack Overflow. (XP-002697996).

(Continued)

*Primary Examiner* — Leon Flores (57) ABSTRACT

The invention relates to a system of automatic correction where certain errors are accepted while others are recognized as errors. This applies specifically to non-machine readable inputs or to optical character recognition when reading or transcribing codes. When entering certain characters, this system would allow certain similar character combinations and number of errors from that set while still maintaining integrity of identification codes.

16 Claims, 4 Drawing Sheets

(51) Int. Cl.
  *G06F 21/31* (2013.01)
  *G06K 9/62* (2006.01)

(56) References Cited

U.S. PATENT DOCUMENTS

| | | | |
|---|---|---|---|
| 4,354,101 A | 10/1982 | Hester et al. |
| 4,463,250 A | 7/1984 | McNeight et al. |
| 4,529,871 A | 7/1985 | Davidson |
| 4,860,226 A | 8/1989 | Martin et al. |
| 4,963,719 A | 10/1990 | Brooks et al. |
| 5,382,779 A | 1/1995 | Gupta |
| 5,467,433 A | 11/1995 | Lamprecht, Jr. et al. |
| 5,621,864 A | 4/1997 | Benade et al. |
| 5,646,389 A | 7/1997 | Bravman et al. |
| 5,767,498 A | 6/1998 | Heske, III et al. |
| 5,805,779 A | 9/1998 | Christopher et al. |
| 5,837,983 A | 11/1998 | Actis et al. |
| 5,850,080 A | 12/1998 | Herzig |
| 5,892,900 A | 4/1999 | Ginter et al. |
| 5,930,215 A | 7/1999 | Fite et al. |
| 5,974,150 A | 10/1999 | Kaish et al. |
| 6,069,955 A | 5/2000 | Coppersmith et al. |
| 6,122,403 A | 9/2000 | Rhoads |
| 6,134,561 A | 10/2000 | Brandien et al. |
| 6,212,638 B1 | 4/2001 | Lee et al. |
| 6,217,966 B1 | 4/2001 | Finster et al. |
| 6,226,619 B1 | 5/2001 | Halperin et al. |
| 6,260,029 B1 | 7/2001 | Critelli |
| 6,272,634 B1 | 8/2001 | Tewfik et al. |
| 6,371,375 B1 | 4/2002 | Ackley et al. |
| 6,442,276 B1 | 8/2002 | Doljack |
| 6,456,729 B1 | 9/2002 | Moore |
| 6,546,729 B2 | 4/2003 | Hellat et al. |
| 6,547,137 B1 | 4/2003 | Begelfer et al. |
| 6,712,275 B1 | 3/2004 | Borg |
| 6,725,366 B1 | 4/2004 | Swanberg |
| 6,832,202 B1 | 12/2004 | Schuyler et al. |
| 6,892,947 B1 | 5/2005 | Jam et al. |
| 6,963,846 B1 | 11/2005 | Kelly et al. |
| 6,996,543 B1 | 2/2006 | Coppersmith et al. |
| 7,028,901 B2 | 4/2006 | Carlson |
| 7,188,258 B1 | 3/2007 | Aggarwal et al. |
| 7,246,748 B1 | 7/2007 | Feuerman et al. |
| 7,267,271 B2 | 9/2007 | Rhea |
| 7,283,630 B1 | 10/2007 | Doljack |
| 7,497,379 B2 | 3/2009 | Chen et al. |
| 7,539,868 B2 | 5/2009 | Balard et al. |
| 8,037,294 B2 | 10/2011 | Nochta |
| 8,175,578 B2 | 5/2012 | McCown et al. |
| 2001/0047340 A1 | 11/2001 | Snow et al. |
| 2002/0053796 A1 | 5/2002 | McCann et al. |
| 2002/0091593 A1 | 7/2002 | Fowler |
| 2002/0158133 A1 | 10/2002 | Conzola et al. |
| 2002/0158137 A1 | 10/2002 | Grey et al. |
| 2003/0042312 A1 | 3/2003 | Cato |
| 2003/0051767 A1 | 3/2003 | Coccaro et al. |
| 2003/0074223 A1 | 4/2003 | Hickle et al. |
| 2003/0126034 A1 | 7/2003 | Cheney et al. |
| 2004/0024790 A1 | 2/2004 | Everett |
| 2004/0084530 A1 | 5/2004 | McQueen et al. |
| 2004/0117265 A1 | 6/2004 | Hoffman |
| 2004/0140362 A1 | 7/2004 | Allen |
| 2004/0172260 A1 | 9/2004 | Junger et al. |
| 2004/0212480 A1 | 10/2004 | Carrender et al. |
| 2005/0006469 A1 | 1/2005 | Nonneman et al. |
| 2005/0097054 A1 | 5/2005 | Dillon |
| 2005/0108044 A1 | 5/2005 | Koster |
| 2005/0127176 A1 | 6/2005 | Dickinson et al. |
| 2005/0189255 A1 | 9/2005 | Safian |
| 2005/0234823 A1 | 10/2005 | Schimpf |
| 2005/0246237 A1 | 11/2005 | Hudetz et al. |
| 2005/0273369 A1 | 12/2005 | Ota et al. |
| 2005/0273434 A1 | 12/2005 | Lubow |
| 2005/0288938 A1 | 12/2005 | Date et al. |
| 2006/0011726 A1 | 1/2006 | Chen et al. |
| 2006/0080190 A1 | 4/2006 | Furukawa et al. |
| 2006/0091209 A1 | 5/2006 | He |
| 2006/0143180 A1 | 6/2006 | Peterson et al. |
| 2006/0144940 A1 | 7/2006 | Shannon et al. |
| 2007/0001006 A1 | 1/2007 | Schuessler et al. |
| 2007/0024449 A1 | 2/2007 | Bilyeu et al. |
| 2007/0203808 A1 | 8/2007 | Sekimoto et al. |
| 2008/0046263 A1 | 2/2008 | Sager et al. |
| 2008/0066167 A1 | 3/2008 | Andri |
| 2009/0014537 A1 | 1/2009 | Gelbman |
| 2009/0105866 A1 | 4/2009 | Fontanot |
| 2009/0159666 A1 | 6/2009 | O'Brien et al. |
| 2009/0230190 A1 | 9/2009 | Chanez et al. |
| 2009/0323967 A1 | 12/2009 | Peirce et al. |
| 2010/0258641 A1 | 10/2010 | Yu |
| 2011/0154046 A1 | 6/2011 | Fradet et al. |
| 2011/0265428 A1 | 11/2011 | Schmitz |
| 2012/0102334 A1 | 4/2012 | O'Loughlin et al. |
| 2012/0130868 A1 | 5/2012 | Loken |
| 2012/0215918 A1 | 8/2012 | Vasters et al. |
| 2012/0228388 A1 | 9/2012 | Kuo et al. |
| 2012/0254052 A1 | 10/2012 | Gao et al. |
| 2012/0284505 A1 | 11/2012 | Smith et al. |
| 2012/0310848 A1 | 12/2012 | Gao et al. |
| 2013/0004946 A1 | 1/2013 | Chesnut et al. |
| 2013/0099901 A1 | 4/2013 | Jones et al. |
| 2013/0169409 A1 | 7/2013 | Chang et al. |
| 2013/0226326 A1 | 8/2013 | Yoshida et al. |
| 2013/0283156 A1* | 10/2013 | Al Badrashiny ..... G06F 17/273 715/257 |
| 2013/0297929 A1 | 11/2013 | Chaves et al. |
| 2014/0046852 A1 | 2/2014 | Chatelain et al. |
| 2014/0122479 A1 | 5/2014 | Panferov et al. |
| 2014/0173685 A1 | 6/2014 | Bittles et al. |
| 2014/0173688 A1 | 6/2014 | Fischer et al. |
| 2014/0189362 A1 | 7/2014 | Van Den Broeck et al. |
| 2014/0351601 A1 | 11/2014 | Jozwiak |
| 2014/0367464 A1 | 12/2014 | Herzig |
| 2015/0269559 A1 | 9/2015 | Inotay et al. |
| 2015/0310386 A1 | 10/2015 | Fradet et al. |
| 2015/0317644 A1 | 11/2015 | Chanez et al. |
| 2015/0332210 A1 | 11/2015 | Niquille et al. |
| 2016/0027021 A1 | 1/2016 | Kerdemelidis |
| 2016/0072626 A1 | 3/2016 | Kouladjie |
| 2016/0299685 A1* | 10/2016 | Zhai ..................... G06F 3/0219 |
| 2016/0307153 A1 | 10/2016 | Loken et al. |
| 2017/0109549 A1 | 4/2017 | Fradet et al. |
| 2018/0131520 A1 | 5/2018 | Brockhaus et al. |

FOREIGN PATENT DOCUMENTS

| | | |
|---|---|---|
| CN | 102542215 | 7/2012 |
| EP | 1 645 992 A | 4/2006 |
| EP | 2104067 | 9/2009 |
| EP | 2172882 | 4/2010 |
| FR | 2 900 486 A | 11/2007 |
| GB | 2342743 | 4/2000 |
| JP | H-05151381 A | 6/1993 |
| JP | H07-156459 A | 6/1995 |
| JP | H08-69247 A | 3/1996 |
| JP | A-2001-328711 | 11/2001 |
| JP | A-20027970 | 1/2002 |
| JP | 2003-104562 A | 4/2003 |
| JP | 2003208234 | 7/2003 |
| JP | 2003233794 | 8/2003 |
| JP | 2005-060080 A | 3/2005 |
| JP | 2005/115890 | 4/2005 |
| JP | A-2005-200187 | 7/2005 |
| JP | A-2005-263472 | 9/2005 |
| JP | 2005-316940 A | 11/2005 |
| JP | 2006229582 | 8/2006 |
| JP | 2007-018355 A | 1/2007 |
| JP | 2007-528830 A | 10/2007 |
| JP | 2008-515741 A | 5/2008 |
| JP | 2009-151668 | 7/2009 |
| KR | 100911762 B1 | 8/2009 |
| RU | 2199781 C1 | 2/2003 |
| RU | 2216776 C2 | 11/2003 |
| RU | 2225641 C2 | 3/2004 |

(56) References Cited

FOREIGN PATENT DOCUMENTS

| WO | WO-02/073551 A1 | 9/2002 |
|---|---|---|
| WO | WO-2005/083644 A | 9/2005 |
| WO | WO-2006/038114 A1 | 4/2006 |
| WO | WO-2010/063909 | 6/2010 |
| WO | WO-2014/122479 | 8/2014 |

OTHER PUBLICATIONS

"Databases—No longer fit for purpose for Serialisation and Track & Trace", 2012.
Extended European Search Report in 15152959.1, dated Oct. 7, 2015, 4 pages.
PCT Written Opinion of the International Searching Authority in PCT/EP2016/051853, dated Nov. 4, 2016, 11 pages.
Extended European Search Report in 15153386.6, dated Oct. 16, 2015, 7 pages.
PCT Written Opinion of the International Searching Authority in PCT/EP2016/052008, dated Jan. 31, 2015, 10 pages.
PCT International Search Report in PCT/EP2016/072453, dated Dec. 5, 2016.
PCT International Search Report in PCT/EP2016/069316, dated Oct. 26, 2016.
PCT International Search Report in PCT/EP2016/070138, dated Dec. 7, 2016.
PCT International Search Report in PCT/EP2016/070137, dated Nov. 14, 2016.
PCT International Search Report in PCT/EP2016/070138, dated Dec. 14, 2016.
Inside Windows Product Activation, A Fully Licensed Paper; Fully Licensed GmbH, Rudower Chaussee 29, 12489 Berlin, Germany; 10 pgs; Jul. 2001.
Dodge et al., Codes of Life: Identification Codes and the Machine-Readable World, Dec. 2005, Environment and Planning D: Society and Space, vol. 23, pp. 851-881 (Year: 2005).
China National Intellectual Property Administration Search Report for Application No. 201580033643.9, 2 pages, dated Jul. 25, 2019.
Modi et al., "Securing the Manufacturing Environment using Biometrics", Oct. 2005, Proceedings 39th Annual 2005 International Carnahan Conference on Security Technology, pp. 275-278 (Year 2005).

* cited by examiner

| Char. Num. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Code | 3 | S | 6 | 8 | P | 5 | F | 5 | W | X | Z | 9 | L | M | J | 4 | 6 | 2 | E | L |

VERIFICATION WITH ERROR TOLERANCE FOR SECURE PRODUCT IDENTIFIERS

This application is the National Stage of International Application No. PCT/EP2016/070138, filed Aug. 25, 2016, which claims the benefit of U.S. Provisional Application No. 62/209,798 filed Aug. 25, 2015, the contents of both of which are hereby incorporated in their entireties.

The present invention relates generally to techniques for product verification and automatic correction of, or allowance for, certain sets errors. When attempting to verify a product identifier, especially when non-machine readable techniques are used, some errors are more likely to occur than others. These errors are often made when manually entering characters for a code by a human or by optical recognition of characters. This invention addresses how to overcome certain types of errors while still allowing for sufficient levels of authentication.

The invention relates to a system of automatic correction where certain errors are accepted while others are recognized as errors and rejected. This applies specifically to non-machine readable inputs or to optical character recognition when reading or transcribing codes. When entering certain characters, some characters may be similar to others, and this system allows certain similar character combinations and number of errors from that set while still maintaining integrity of identification codes.

Strict adherence to character recognition increases security in an authentication system. However, when humans or optical recognition of characters are used for reading or transcribing the characters, certain errors may occur. This may be due to visual acuity issues or resolution issues when attempting to read characters. To overcome certain errors when similar characters are entered, the system needs to be able to recognize certain similar characters while maintaining the integrity and security of the system. Allowing for similar characters to be entered lowers the number of possible combinations when using a specific number of characters.

The following embodiments of the invention are exemplary and are not intended to be limiting of the scope of the invention. While one or more embodiments of the present invention have been described, various alterations, additions, permutations and equivalents thereof are included within the scope of the invention. In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. Various computations that are described below, such as those within the code initialization, generation, and authentication procedures, need not be performed in the order disclosed, and other embodiments using alternative orderings of the computations could be readily implemented. In addition to being reordered, the computations could also be decomposed into sub-computations with the same results.

Embodiments of the invention will now be described, by way of example, with reference to the accompanying drawings, in which.

According to an embodiment of the invention for verifying that a user code entered into a computing system matches a true code, the method comprises: defining a set of code characters that can be used in a product identity code; defining one or more subsets of the code characters, each of the subsets comprising two or more predefined identification equivalents of a set of code characters, each subset having a predetermined subset identifier; defining a transformation to generate an identity of a true code based on the predetermined subset identifier; receiving a user entered code, comprising receiving a set of one or more code characters entered by a user for the purpose of verifying a product; deciphering the user entered code by application of the transformation to obtain an identity of the user entered code; generating an identity of the true code; and verifying the identity of the user entered code matches the identity of the true code.

In an alternative or additional embodiment, the method further comprises defining a true code comprising one or more code characters derived from a product identity. In an alternative or additional embodiment, the method further comprises the step of comparing the user code and the true code. In an alternative or additional embodiment, the step of comparing further comprises one or more of determining the number of errors or types of errors detected between the user entered code and the true code. In an alternative or additional embodiment, one or more of the number of errors and types of errors detected between the user entered code and true code are recorded.

In an alternative or additional embodiment, the step of verifying the true code comprises verification of the true code only when one or more of the number or errors and type of errors is below a predetermined threshold. In an alternative or additional embodiment, all code characters are contained within one or more subsets. In an alternative or additional embodiment, all subsets contain only two code characters.

In an alternative or additional embodiment, each error has an associated probability score and correction of the one or more errors detected in a user entered coded is completed based upon the probability score associated with the one or more errors detected and only correcting the code if the probability score of the correction is above a pre-defined threshold. In an alternative or additional embodiment, the probability score associated with an erroneous user entered character is influenced by the characters that are next to the erroneous user entered character.

In an alternative or additional embodiment, two sequentially user entered characters are detected as errors and correction of both characters is made by transposing the two sequentially user entered characters detected as errors, resulting in the characters being correct as compared to the true code, whether or not the probability score of correcting either error is above a pre-defined threshold.

In an alternative or additional embodiment, a system for verifying that a user code entered into a computing system matches a true code comprises a computerized processor configured for executing instructions for: defining a set of code characters that can be used in a product identity code; defining one or more subsets of the code characters, each of the subsets comprising two or more predefined identification equivalents of a set of code characters, each subset having a predetermined subset identifier; defining a transformation to generate an identity of a true code based on the predetermined subset identifier; receiving a user entered code, comprising receiving a set of one or more code characters entered by a user for the purpose of verifying a product; deciphering the user entered code by application of the transformation to obtain an identity of the user entered code; generating an identity of the true code; and verifying the identity of the user entered code matches the identity of the true code.

In an alternative or additional embodiment, the system further comprises instructions for defining a true code comprising one or more code characters derived from a product identity. In an alternative or additional embodiment, the system further comprises instructions for comparing the user code and the true code. In an alternative or additional embodiment, the system further comprises instructions for determining the number of errors or types of errors detected between the user entered code and the true code.

In one embodiment of the invention, different types of errors can be characters that appear similar, such as O, 0 and Q, another type of error can be characters that are in physical proximity to each other such as character keys surrounding the correct character. A further example of another error type can be transposing two characters that are next to each other in the code. An example would be where the true code is AZSXDC and a user enters AZXSDC. Though S and X are not visually similar, they are in physical proximity. They can be counted as two errors of physical proximity errors. Alternatively, since the location of the previous error and its type is recorded, this can be identified as a transpose error since both errors involve physical proximity errors near each other and if this single correction is made, then the code is correct. Others examples also exist, such as when using non-QWERTY keyboards or if entry requires going from one language or encoding to another such as from entering the binary equivalent of a hexadecimal code or going from a QWERTY keyboard to Japanese Kanji.

In some instances, more than one kind of error can exist for the same key. An example is in a QWERTY keyboard, O and 0 are in close physical proximity to each other, and they often are considered to be optically similar. However, O and Q are not in close physical proximity but can be considered optically similar. Therefore, the method can have each of these errors only be accepted as one, e.g. O and 0 is only considered an optical error, or a physical location error. In another case, it may be counted as two errors, such as if the true code is OO0O, and O0OO is entered, it can be counted as two physical location errors, or two optically similar errors or as one transpose error, or as one of each kind of error. The method can have a cap on a total number of errors. Alternatively, it can have limits on each kind of error. It can also have limits such as different combinations of errors are not counted such as, if there is a transpose error that also could be counted as two optical errors or two physical location errors, it records a tally for all of these types but when counting the number of errors for accepting a code, it counts it as a single transpose error, or any other way that minimizes the number of errors. Alternatively, the system, for maximum security can be set to count the maximum possible number or errors instead.

Figure 1:
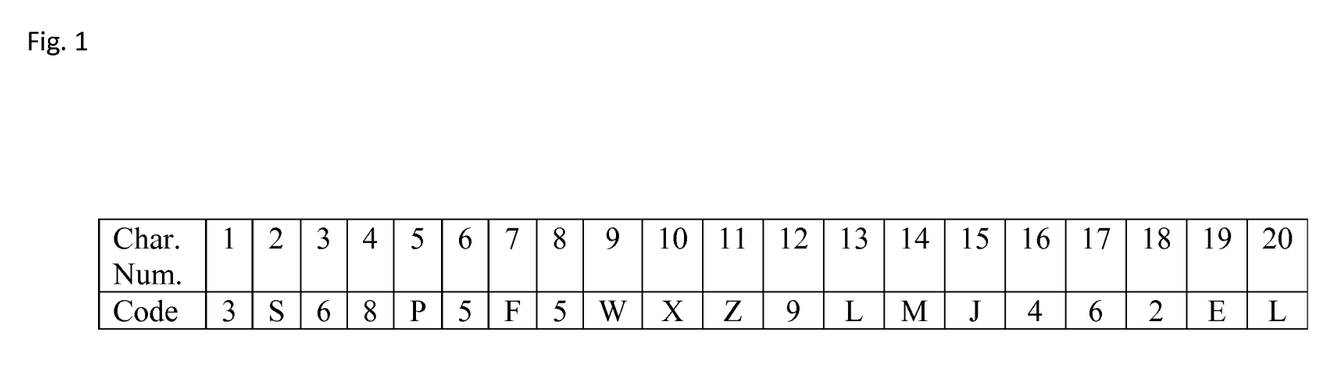
FIG. 1 illustrates an example table of an alphanumeric code.

FIG. 1 provides an illustrative example of an alphanumeric code for use in the present invention. The length of the code, number of characters and types of characters are only designed to show an example and are not restrictive to the number or types shown.

For this invention, a code is entered by a user or by an optical character recognition method. This code is then converted into an Identity. An Identity is the deciphered code entered by a user, such as if the code needs to be decrypted in order to obtain the original values or run through a hash or in some other way is not the exact string of characters that will be compared to the true Product Identity, which is the proper code the user is attempting to match. If there is no obfuscation, encryption, hash or other method used, and only the user entered characters are being compared, then in this case the user entered code is the Identity.

With auto-correction there are fewer Identities available than codes because of the defined subsets that may be used for error correction. This invention also uses predefined identification equivalents which for example include, but are not limited to, alphanumeric characters, symbols such as ASCII symbols and characters in other alphabets, such as Chinese characters, Hiragana and Katakana characters, Cyrillic and other characters used.

For a group (G) of n fields, where each n field (F) contains at least m distinct elements (e), i.e. the elements are distinct over the n fields and are part of the group of elements E. The elements may be any alphanumeric character, including non-English letters and numbers, ASCII symbol, etc. There is a function Size as the number of elements in a group, $G(i)$ where $0<I<n$ is the group containing at least m unique elements e, where $e \in E$. $F(i,j)$ where $0<I<n$ and $0<j<Size(G(i))$. (Note that $Size(G(i)) \geq m$). The properties of these groups are such as $Size(E) \geq m \cdot n$. For the group of codes over E of length l, we note it as C where $C=E^l$ such that such that code is defined as an element of C where code=$\{e_0, e_1, \ldots e_{l-1}\}$. Also defined for a code the identity as $\{i_0, i_1, \ldots, i_{l-1}\}$ such as $e_k \in G(i)$ for $0 \leq k < l$, with a numerical representation of such that identity equals $\Sigma i_k \cdot m^k$ where $0 \leq identity < m^l$ and define for a code the security as $\{j_0, j_1, \ldots, j_{l-1}\}$ such as $e_k = F(i_k, j_k)$ for $0<k<1$, with a numerical representation security=$\Sigma_{k=0}^{k<l} j_k \cdot \Pi_{\alpha=0}^{\alpha<k} Size(G(i_\alpha))$.

One of the benefits of this invention is that, to retrieve identity of a code, the user does not need to know the security and therefore the user can accept errors in the reading or entering of the code for elements of the same field. For example, if E={A, B, C, D, E, F, G, H, I, J, K, L, M, N, O, P, Q, R, S, T, U, V, W, X, Y, Z, 1, 2, 3, 4, 5, 6, 7, 8, 9} and G={{A,R}, {B,8}, {C,G}, {D, O, Q}, {E,4}, {F, P}, {H,N}, {I,1}, {J,Y}, {M,W}, {S,5}, {T,7}, {U,V}, {X,K}, {Z,2}, {L,6}, {3,9}}. In this example n=17 and m=2 and if a code of length is defined as 12 characters, the identity in that respect is $0<identity<17^{12}$. 12 is used as an example only because the identifier number used is 12 digits long. Furthermore, defining security size as $\Pi_{k=0}^{k<k} Size(G(i_k))$, and based on G above, the security size for this set G is $2*2*2*2*2*2*2*2*2*2*2*3=2^{11}*3=6144$. If any of the fields was four characters, such as {D, O, 0, Q} then the multiplicative factor for the set G would be four, instead of three in the previous equation when the field was {D, O, Q} only. This allows for more variations of errors accepted, but would reduce the security of the system at the same time. The security size can be used in the method of deciphering the characters into the original based on the method used, such as a truncated hash or other encryption/decryption or deciphering means.

Once a code is selected, this method can be used to obtain the Identity of the user entered code and compare it to the original Identity. The original Identity being the correct, non-error corrected, character set. Even if the Identity has been enciphered, this error correction method can be used. When running the enciphering algorithm, each of the combination of similar characters can be flagged, such that if one of the characters is entered, and the algorithm is run, it can check if the other similar character is the correct character. If they are one of the sets of similar characters, then it is acknowledged as being correct.

This system can also be set to allow only a certain number of similar character errors to be accepted, such as if there is a 20-character chain, no more than, for example, three characters can be mistakenly entered. It can also be set that if more than three characters in the sequence are entered incorrectly, if two or more are the same character and the same incorrect character is used, it is counted singly or not counted as an incorrect character. For example, if a user enters the number 5 for characters two, six and eight, the system can be set to accept the code, and to count it as one error, character two being 5 instead of S, or as zero. The same can be done if S is entered for all three characters. Alternatively, if S is entered for characters two and six, but 5 is entered for character eight, the system can again accept it or count it as a single error. Also, if 5 is entered for character two and S for character six and eight, this can be counted as zero errors, one, two or three errors depending on how strict the system is desired to be. It can be considered one error in that 5 and S were transposed for each other, therefore otherwise it is correct, two errors, such that all S characters were transposed with a 5 and all 5 characters were transposed with an S. Alternatively, it can be on an individual basis such that each individual character that is transposed is an error but accepted.

There are various methods and times at which to incorporate the auto-correction method. The first is when the characters are first entered. The set can recognize that these are part of an error correction set and automatically be set to use one of the characters, e.g. of the set {D, O, Q} to only use 0, in this example 0 would be the representative character for the defined subset {D, O, Q}. This method has the advantage that if the error correction is completed earlier, however, fewer options for distinct usable characters exist. The error checking can be automatically conducted.

An alternative is to run the normal conversion method going from the characters present, through the hash, decryption or any other deciphering method(s) to determine what the original numbering is (prior to the first enciphering of the number/letter), and then error check to determine if the characters fall into one of the auto-correcting sets. This can be done by knowing, after the method has been run and the original number or letter is obtained, that said original number's enciphered number was in one of the fields of set G. This method also does not require any substitution. It allows for accepting of any of the codes entered as long as the characters fall into the pre-defined subsets.

Alternatively, a method can be used in which after a user enters the code, it is checked to see if any of the error-correction needs to be done prior to deciphering the code through any hash, decryption or other method. If one or more characters are entered incorrectly, the ones that fall into the predefined subsets can be accepted as correct and then the code can be deciphered and accepted as correct. This allows for maintaining the user entered code even though it may not be the true identity code.

Auto-correction can also be done after the entire string of alphanumeric characters is entered, but prior to deciphering them. With this method, a character string can be separated into preceding and subsequent string segments based upon the location of a character that is part of a defined subset or a high enough content probability score. A new string is created using the preceding string segment, the corrected character and the subsequent string. The process can be run iteratively, such that only a single character is corrected each time, with a preceding and subsequent strings changing. Using FIG. 1 as an example, the first time a character is to be replaced is character number six, therefore the preceding string would be characters one to five, and the subsequent string would be characters seven to twenty. The new string would use the preceding string, the corrected character six and then the subsequent string, and the error correction would continue on with checking the remaining characters, and for example, find that character 17 should be autocorrected, the preceding string would be characters one to 16, with character six being the corrected character and the subsequent string being characters 18 to 20. Alternatively, multiple preceding and subsequent string segments can be created if more than one character is to be corrected. Using the example above, the first preceding string would be characters one to five, the second string would be seven to 16 and the final subsequent string would be 18 to 20. Characters six and 17 would be corrected and then the string would be reconstructed using the multiple segments and the corrected characters.

Substitution of characters can also be done instead of using the code Identity by using their likelihood of being substituted by error. Content probability scores can be calculated or predefined. A higher content probability score can be set for O being substituted for 0 than O and Q, or O and C. Also on a standard QWERTY keyboard, content probability scores can be set for keys surrounding and near the entered key. For example, on a QWERTY keyboard layout, the letter D is surround by W, E, R, S, F, X, C, and V. Each of these can have a content probability score associated with them, and they can be different, for example, C may be considered optically more similar to D than W or R and as such can be set to have a higher content probability score of being substituted. Certain keys may have multiple content probability scores associated with them. For example, one score for physical proximity and another for character similarity. This scores can be defined differently for different keypads, e.g. for barcode scanners that have a keypad, or a smartphone keypad that differs from a QWERTY setup etc. Scores can be combined in a non-linear fashion such as taking into account both key location and optical similarity of keys to increase the score or to ignore physical location based on letter optical similarity or be set to only add to the content probability score. Keys can also have different scores for capital as compared to lower case letters or numbers on the keys. When content probability scores are used, a threshold score can be set by the system to make certain substitutions.

A content probability score can also be assigned to a string of characters instead of, or in addition to, an individual character by character basis. If certain character combinations are decided to be more likely to be entered, then these can be monitored for and if they are detected, auto-correction of these can be accomplished. For example, the string "TEH" may be assigned a high probability of being "THE" and therefore if the prior string is recognized, correcting or accepting it as the latter string. This can also work for numerical items, such as if a binary sequence is used and a user enters "01007011" instead of "01001011", the system can again correct to the latter, higher probability content score form.

State graphs can also be used for correcting errors. This is especially useful when full words or phrases are used and the content score is calculated for each word and for the entire phrase as a whole. If a certain word has a low content score and correction of that word would lead to a high content score, the word can be corrected, such as replacing "too" with "to" or "two" depending on the increased content score of the phrase and word. This can be done by similarity of alphanumeric strings or by words etc.

In one embodiment, a single character may be entered. In this embodiment, it may be preferable to reduce the content probability of an error being entered or disallowing substitution of characters all together if so desired. This can also be achieved by tying in the number of allowable errors to the length of the number of characters entered, e.g. number of errors to be correct is less than the number of characters entered. This can be varied in the normal ways of accepting more or fewer corrections, from the total number entered down to zero, depending on the number entered or any other normal algorithm that one may use to determine how many errors can or will be corrected.

Example computer-executable instructions for performing the inventive methods are provided below.

```
using System;
using System.Collections.Generic;
using System.Linq;
using System.Text;
using System.Threading.Tasks;
namespace ConsoleApplication1
{
    class Program
    {
        static string[ ] Groups = new[ ] { "AR",
"B8",
"CG",
"DOQ",
"E4",
"FP",
"HN",
"I1",
"JY",
"MW",
"S5",
"T7",
"UV",
"XK",
"Z2",
"L6",
"39"};
        static int numberOfGroups = Groups.Length;
        static void Main(string[ ] args)
        {
            //codeGenID
            int id = 122334;
            int noise = SecurityFunction(id);
            var gr = new int[12];
            //Convert your ID to base numberOfGroups (17)
            for (int i = 0; i < 12; i++)
            {
                gr[i] = (id % numberOfGroups);
                id = id / numberOfGroups;
            }
            // Calculate the total size of the security (Noise)
Number of Elements in each selected group
            int noiseSize = 1;
            for (int i = 0; i < 12; i++)
            {
                noiseSize = noiseSize * Groups[gr[i]].Length;
            }
            // Truncate the generated security with the available one in the code
            var usedNoise = noise % noiseSize;
            // Create the code by selecting the element in the group based on the security
            StringBuilder stb = new StringBuilder(12);
            for (int i = 0; i < 12; i++)
            {
                stb.Append(Groups[gr[i]][noise % Groups[gr[i]].Length]);
                noise = noise / Groups[gr[i]].Length;
            }
            Console.WriteLine("Code = " +stb.ToString( ));
            Console.WriteLine("Enter User Code");
            string code = Console.ReadLine( );
            id = 0;
            usedNoise = 0;
            int carryOver = 0;
            // Extracting the id and the user entered security from the user entered code
            for (int i = 11; i >= 0; i--)
            {
                var ch = code[i];
                for (int j = 0; j < numberOfGroups; j++)
                {
                    var index = Groups[j].IndexOf(ch);
                    if (index >= 0)
                    {
                        id = id * numberOfGroups + j;
                        usedNoise = usedNoise * carryOver + index;
                        carryOver = Groups[j].Length;
                    }
                }
            }
            Console.WriteLine("Id = " + id);
            Console.WriteLine("Compare Security = " + (usedNoise == (SecurityFunction(id) % noiseSize)));
            Console.WriteLine("Enter to exit");
            Console.ReadLine( );
        }
        private static int SecurityFunction(int id)
        {
            return 345;
        }
    }
}
```

Integration with Secure Production Systems

The systems and methods described above for verification can be used in combination with systems for generating secure identifiers for use with a production.

As used herein, an entity may refer to: i) a person, such as a consumer of a product; ii) a group, such as a group having a common interest, such as retailers; iii) a computing device; iv) a computing node in a networked system; v) a storage location, such as a memory storage unit storing a document; vi) a virtual point in a network, such as representing a business function within a business enterprise, and the like. Additionally, an entity may represent a point in a workflow, such as for authorization, which may be performed by a person responsible for that aspect of the workflow or a computing device which provides automated processing. The term entity is not meant to be limited to any one of these examples and may extend to other situations consistent with the concepts described herein.

Control Module

Figure 2:
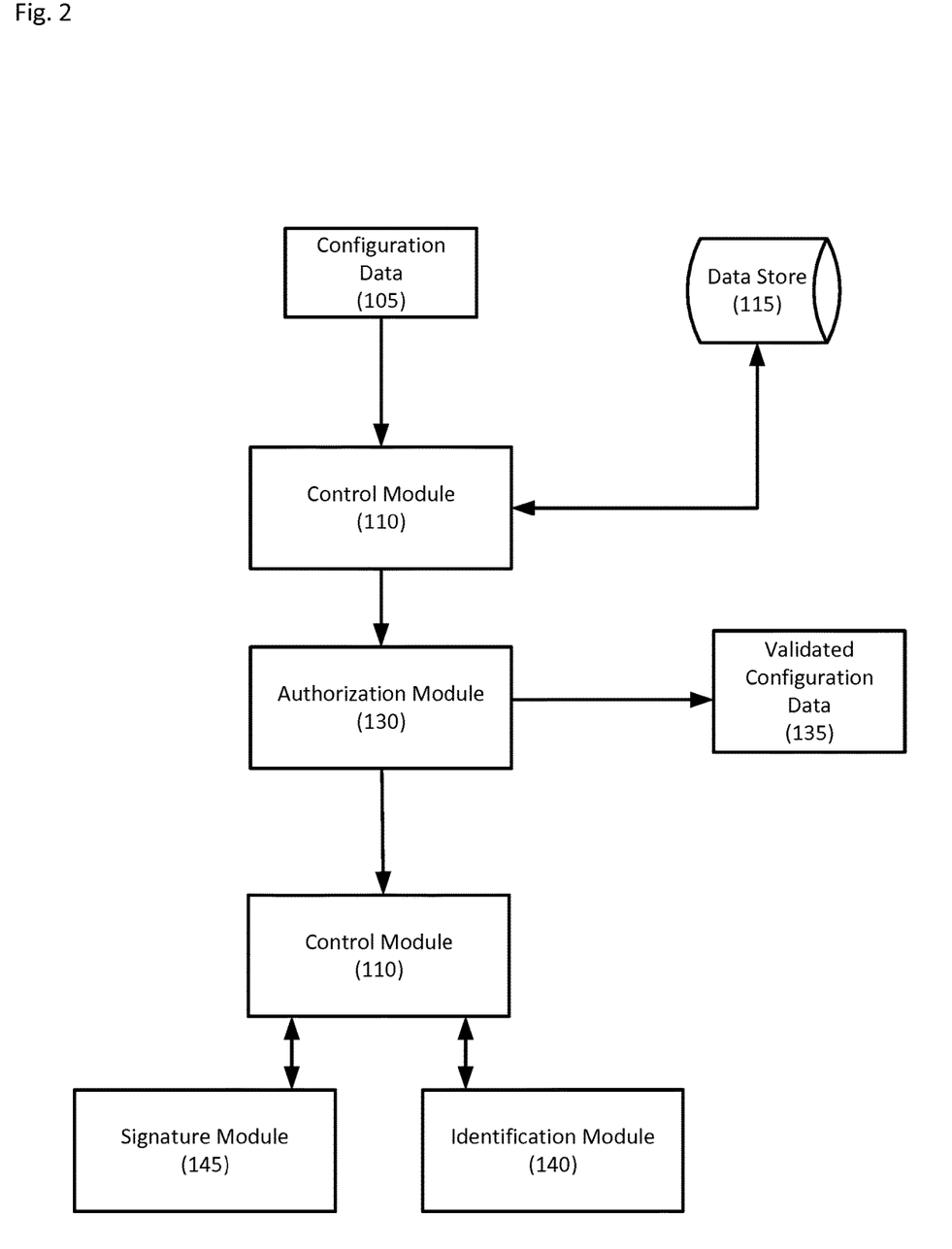
FIG. 2 illustrates an example method for code initialization.

With reference to FIG. 2, the Control Module (also known as the "Orchestrator") (110) can receive input from any of the other modules or outside sources and can provide instructions to the other modules in the system based on pre-configured programs and/or the operator inputs to it. It can also generate a dashboard summary of the system status.

Input to the Control Module can include any or all configuration data (105). The supplied configuration data can indicate any or all of the parameters including, but not limited to, machine for production, production line, factory, product to be produced, and volume of product. The configuration data may indicate what items (for example, products) are to be marked with the secure identifiers and how those items may be produced. The configuration data may indicate a range of products, such as starting and ending product identifiers. In some embodiments, the range can be a set of product identifiers. The configuration data may be provided by an operator of the system or be dynamically or automatically generated. The configuration data can include further executable instructions or an interpretable algorithm. The configuration data may be based on operator input or the output of a manufacturing execution system, or other centralized system for instructing how and what to produce.

The Control Module (110) can transmit the configuration data to any module, including but not limited to the Authorization Module (130), the Identification Module (140), and the Signature Module (145).

The Control Module can request authorization from the Authorization Module to execute a production operation. This process involves transmitting a request (including some or all of the configuration data) to the Authorization Module and receiving signed or encrypted configuration data. In some embodiments, the Authorization Module can return the configuration data to the Control Module, including a digital signature applied to that configuration data. The Authorization Module determines whether to authorize the request from the Control Module based on the data it receives. In addition, the information returned by the Authorization Module included in the Configuration data can be used to bound the codes generated with the authorization provided. As the data is signed by the Authorization Module, the system can be prevented from modifying the configuration data. As a non-limiting example, a modification of a request to produce one brand on in place of another may be controlled, allowed, or denied.

Authorizations received from the Authorization Module can also be transmitted to the Verification Module so that verification requests can be subsequently processed against those authorizations. The data transmitted to the Verification Module can include a secure identifier, as well as any of the configuration data. In some examples, the configuration data sent to the Authorization Module can include product range information.

The signed or validated configuration data can be the some or all of the set of input parameters of the Control Module, verified and validated by the Authorization Module, which remains in force during a production. A security token can be an output from the Authorization Module and/or an input parameter of the Control Module. The security token can be a proof that the product identifier corresponds to validated configuration data and therefore to an authorized production. The security token can be an input to the Signature Module to generate a signature for a single product identifier, or the signature of a single product identifier, or a product identifier itself, or a range of products or product identifiers. The security token can be a unique code, a random code, or a pseudo-random code. The security token can be any numerical, or alphabetic, or combination of numeric and alphabetic characters.

Authorization Module

The Authorization Module operates to validate requests for authorization to take an action in the identification system. In some embodiments, it can operate as a license manager.

The Authorization Module can receive the configuration data. The Authorization Module can also receive range and/or algorithm information. In some embodiments, the Authorization Module can receive input configuration data from the Control Module. The output range can optionally identify a range of products, machines, factories, ranges, or product volumes that are authorized. The output can also include range information and/or include an algorithm which comprises a set of executable or interpretable instructions that will be used to generate the security token. The Authorization Module can be centralized at the factory level or be decentralized on each production line, or a combination of both.

The Authorization Module can store and/or generate one or more encryption keys. In some embodiments, the key stored by the Authorization Module can be a private public encryption key according to a public key infrastructure (PKI). In some embodiments, the Authorization Module stores the only copy of the private key. In other embodiments, the Authorization Module is distributed across several instances which replicate the keys between them. In the case of PKI, the Authorization Module can output signed configuration data. In some embodiments, the Authorization Module can encrypt the configuration data and/or sign the configuration data output.

In some embodiments, the system is configured so that only the Authorization Module can read the secured input parameters of the Control Module, required for the generation of the security token. In some embodiments, the key is provided to the Authorization Module from another source.

The Authorization Module can be embodied as a hardware security module (HSM), or another type of physical computing device that safeguards and manages digital keys for strong authentication and providing cryptoprocessing. The Authorization Module functionality can be performed by a computer with an embedded board with an encryption key or PKI private key. The module can be equipped with features such that attempts to access the data will result in it being rendered unreadable or inaccessible.

If the input to the Authorization Module is a range and an algorithm, the Authorization Module can output an identity in the range of authorization and a security token of the identifier. For example, the output identity can be a range from 0 to 1,000 with a security token for each item in the range.

The Authorization Module can generate a key from any parameter used in the Control Module. In some embodiments, the Authorization Module may generate or derive a key from an existing key from any parameter used in the Control Module such that only a specific Authorization Module can use this key. The equipment and software implementing this public key technique can be embodied in an asymmetric cryptosystem.

The output of the Authorization Module can be information, such as the configuration data and, optionally, one or more security tokens, with a digital signature provided by the Signature Module. Alternatively, the output of the Authorization Module can be the configuration data encrypted to a key held by the Authorization Module. The output of the Authorization Module can be provided to the Control Module.

According to an embodiment, the method for authenticating a production of products includes electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

In an alternative or additional embodiment, the configuration data represents a range of products to be produced. In an alternative or additional embodiment, the configuration data represents a range of products, machines, factories, ranges, or product volumes that are authorized. Alternative or additional embodiments can include receiving a verification request, the request comprising a product identifier and determining if the configuration data for the production run is authorized by reference to a license manager. Alternative or additional embodiments can include generating a security token for a range of products; and associating the security token with the range of products.

Signature Module

Figure 3:
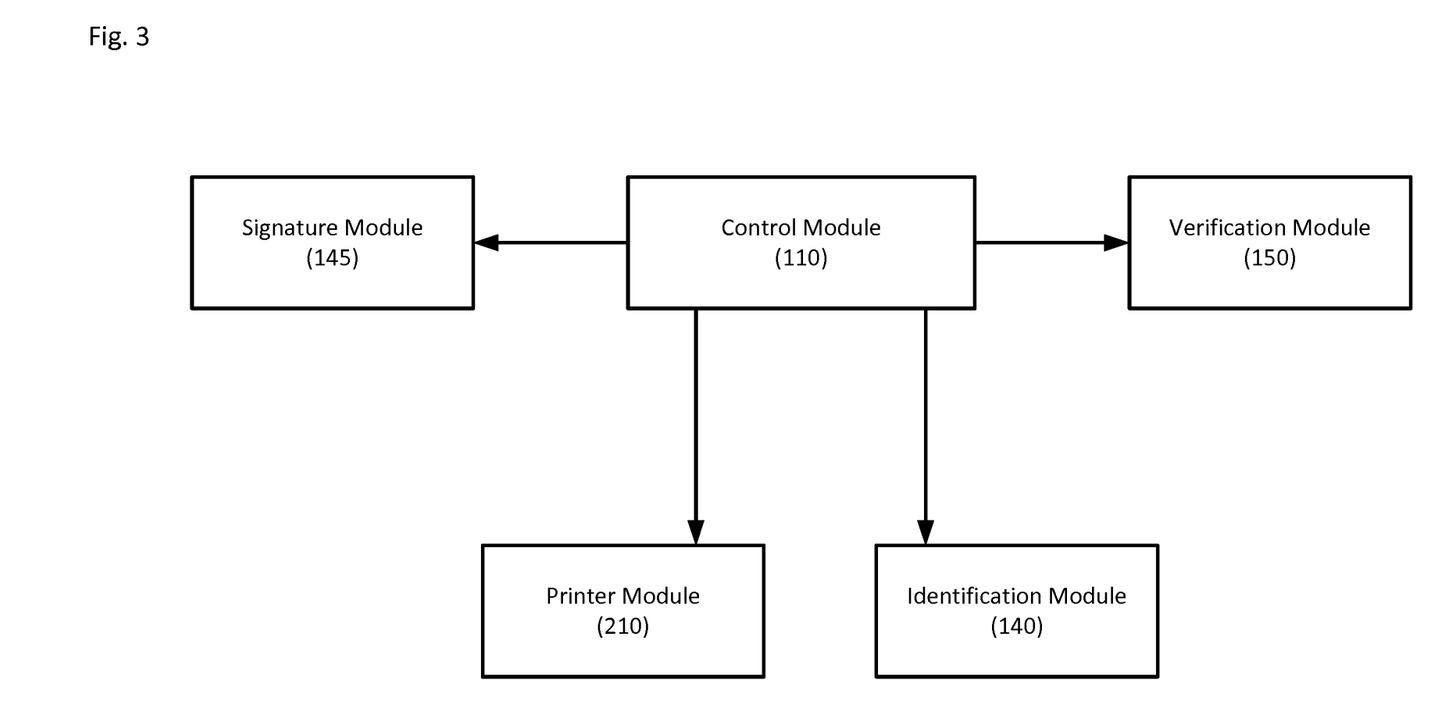
FIG. 3 illustrates an example method for code generation.
Figure 4:
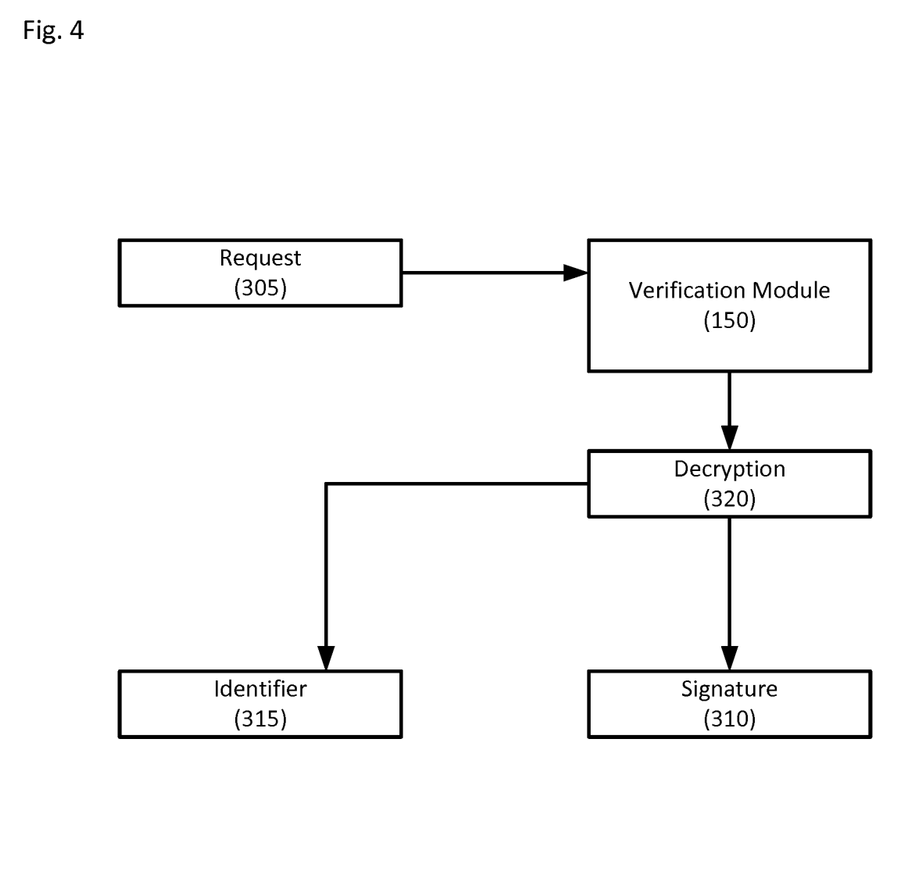
FIG. 4 illustrates an example method for code authorization.

With reference to FIGS. 2-4, the Signature Module can receive the configuration data, an authorization key, a security token or any combination of them, as well as a unique product identifier generated by the Identification Module. In some embodiments, the Signature Module may receive, in addition, one or more intrinsic machine and/or product characteristics, and/or product item characteristics. The Signature Module can create a digital signature based on any or all of those inputs, generally referred to herein as configuration data.

To generate the digital signature, in some embodiments, the Signature Module can first generate a digest or other representation of the configuration data. In some embodiments, the digest can be generated by calculating a cryptographic hash value of the configuration data according to a digital signature algorithm provided by the Signature Module executing the digital signature algorithm. As non-limiting examples, the hash may be calculated according to MD5, SHA-1, SHA-2, SHA-3/Keccak functions. The digest can then be encrypted using a private key obtained by the Signature Module to generate the digital signature.

In some embodiments, a digital signature may use a Public Key Infrastructure (PKI) technology to establish authenticity of configuration data. PKI systems use certificates and keys to identify entities, individuals, or organizations. The Authentication Module uses a private key to sign the configuration data and associates the configuration data with a certificate including the public key used by the Authentication Module.

A recipient module uses a public key to verify the digital signature and, thereby, the authenticity of the signed configuration data. Supporting technologies can be employed to establish other non-repudiation features, such as the time of signing and the status of the signing keys. The public key may be provided to the recipient entity directly, or by publication in an on-line repository or directory.

Identification Module

The Identification Module can receive the configuration data and generate identifiers for items to be marked. The Identification Module can receive a digital signature generated by the Signature Module that will be combined with the unique identifier to generate a compound unique identifier.

The identifiers can include, or be based on, the date and/or time of production of a product to be marked and the digital signature received from the Signature Module. In some embodiments, the secure identifiers generated can be unique or substantially unique. In some embodiments, the secure identifiers can be the security token.

In the case of ranges, the Identification Module can generate a range identifier and a set of identifiers within the generated range.

The identifiers created may be output to a print control module for direct printing on to a product or may be input to further processing to generate another code that is printed on product packaging.

Verification Module

With reference to FIG. 4, the Verification Module (150) can be configured to use the enhanced verification methods described above. The Verification Module can further be configured to receive the verified configuration data and, based on that validated configuration data, validate a request for authorization (305) for a factory, machine, product, or production volume reported. The inputs to the Verification Module can include any or all of the verified configuration data, output from the signature module, identifiers, security tokens, and/or range information. The Verification Module can generate information for an Authorization Module with these parameters in order to verify/validate a product identifier.

The Verification Module can generate a decryption (320) of the request, which includes one or more identifiers or ranges of identifiers (315) and signature data (310) including one or more security tokens.

If a security token is input to the Verification Module, the Verification Module can return information relating to the authorization, the configuration data, and/or ranges. If a single security token is used for a range of products, the security token can be provided to the Verification Module to verify parameters associated with the range of products, rather than individual products. This embodiment may be particularly useful in the context of export regulation.

System Processes

Identification Code Initialization

Identification Code Initialization can be performed to validate the authorization and the parameters. In some embodiments, for performance reasons, this can be performed once at the beginning of the production. With reference to FIG. 2, the Control Module (110) can access a data store (115) for additional parameters, or additional parameters can be provided to the module. The parameters and the configuration data, once signed by the Authorization Module (130), form the validated configuration data (135). The Control Module receives verified configuration data as described above, in response to its request to the Authorization Module (130).

The authorization can be an authorization to produce a product, or to mark a product with a certain ID, or both. The configuration data and the additional parameters are transmitted to the Authorization Module and are used by the Authorization Module to generate the security token. The Authorization Module can sign the configuration data and the additional parameters, forming the signed configuration data. As discussed above, the configuration data can specify a certain production run or other products and activities. The Authorization Module can generate an authorization block including a key, authorized identifiers, and security token. In some embodiments, the key may be generated by the Authorization Module, or may be provided to it. The Authorization Module can transmit the authorization block to the Control Module. The Control Module can transmit the validated configuration data and other information, such as a list of identifiers, a range of identifiers, and/or one or more security tokens, to the Signature Module (145). The Signature Module can sign the data and send the signed data and the signature to the Control Module. The Identification Module (140) can then receive from the Control Module an initialization block including the identifiers and/or ranges of identifiers for products.

An embodiment of the invention can include a method for initializing a process for securely controlling a production facility, comprising: electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; and at the signature module, signing the validated configuration data.

Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Alternative or additional embodiments can include receiving the digitally signed configuration data and the digital signature at a production machine; at the production machine, verifying the digital signature associated with the digitally signed configuration data; and calculating a set of secure product identifiers based on the digitally signed configuration data.

Alternative or additional embodiments can include producing products in a production run according to the digitally signed configuration data; and printing the set of secure product identifiers on the products according to the digitally signed configuration data.

Alternative or additional embodiments can include determining whether the production run is authorized further comprises retrieving licensing data from a licensing server.

Identification Code Generation

With reference to FIG. 3 the Code Generation process generates the codes during the production process. The identification code generation process can begin with a request to the Identification Module (140) for an identifier or a range of identifiers, which are then returned to the Control Module (110). The identifiers are then sent to the Signature Module (145), which signs the identifiers and returns the signed identifiers to the Control Module. The Signature Module can receive a security token. In some embodiments, the Signature Module does not need to be controlled by external instructions and if any identification code is to be counted, the code can be linked to a single security token. The Signature Module can be controlled by the Authorization Module. The Control Module can then send the output data to print control in Printer Module (210). The output data sent to the print control may be encrypted before transmission. The configuration data, can be transmitted to the Verification Module (150) for the handling of subsequent verification requests.

An embodiment of the invention includes a method for generating a code for securely identifying products produced at a production facility, including electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; at the signature module, signing the validated configuration data; at an identification module, receiving a request for a product identifier and generating a product identifier in response to the request; transmitting the product identifier from the identification module to a signature module; digitally signing the product identifier at the signature module; and transmitting the digitally signed product identifier to a printer module.

Alternative or additional embodiments can include electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; at the signature module, signing the validated configuration data.

In alternative or additional embodiments, the request is for a range of identifiers. Alternative or additional embodiments can include determining if the configuration data for the production run is authorized; if the production run is authorized: generating a security token and associating the token with the configuration data; and digitally signing the configuration data by generating a digital signature and associating the digital signature with the configuration data.

Verification of Identification Code

As described above, the Verification Module (considered here in the singular as the serial or parallel relationships of multiple logical or physical Verification Modules) can receive a request for verification. The request can include one or more identification codes. The verification module can decrypt or otherwise deobfuscate the identifier code received. The resulting information, having been decrypted, can include a signature component and an identifier. The resulting identifier can then be linked against the original configuration data previously stored in association with the identifier. The linked data can include other identifiers in a range, a security token, and other information stored in connection with the production of the product bearing that identification code.

Some embodiments can include additional functionality for processing identifiers that are provided to the Verification Module based on the party requesting the verification of the code. Different parties can be provided with different means to access the Verification Module. For example, a retailer or other form of merchant, may be provided with a different portal or communication channel than a consumer. The retailer may also be required to authenticate itself to the Verification Module.

In some embodiments, the system can be configured so that a verification by a consumer results in an identifier being marked as having been verified. The system can be further configured to store those codes for which verification is requested by a consumer. Any subsequent requests for verification of those already-verified codes can be denied or otherwise processed differentially.

Export Functions

Embodiments of the invention can be applied in the context of code export to third-parties. Those embodiments can include an export function configured to generate a separate code for this purpose. The exported code can be generated by collecting one or more product identifiers and/or security tokens, and signing those identifiers and/or tokens. The identifiers and/or tokens can be collected at any point in the production process. The signed identifiers and/or tokens in the form of exported codes can be provided to a third party who can store them and perform verification of the validity of the identifiers and/or tokens.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™ JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™ Apple™ Mac™, iOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A method of verifying that a user code entered into a computing system matches a true code, the method comprising:
    defining a set of code characters that can be used in a product identity code;
    defining one or more subsets of the set of code characters, each of the subsets comprising two or more predefined identification equivalents of the set of code characters, each subset having a predetermined subset identifier;
    defining a transformation for generating an identity of a true code based on the predetermined subset identifier;
    receiving a user entered code, comprising receiving a set of one or more code characters entered by a user for the purpose of verifying a product;
    deciphering the user entered code by application of the transformation to obtain an identity of the user entered code;
    generating the identity of the true code;
    comparing the user entered code and the true code, wherein the step of comparing further comprises one or more of determining the number of errors and types of errors detected between the user entered code and the true code;
    assigning a character from the set of code characters a first content probability score associated with physical proximity to another character from the set of code characters and a second content probability score associated with character similarity of the character to another character from the set of code characters;
    wherein each error has an associated content probability score;
    combining the first content probability score and the second content probability score non-linearly to create a combined probability score;
    correcting of the one or more errors detected in the user entered coded based upon the combined probability score and only correcting the user entered code if the combined probability score of the correction is above a pre-defined threshold; and
    verifying an identity of the corrected user entered code matches the identity of the true code.

2. The method of claim 1, further comprising defining a true code comprising one or more code characters derived from a product identity.

3. The method of claim 1, wherein method further comprises the step of comparing the user code and the true code.

4. The method of claim 1, wherein the step of comparing further comprises one or more of determining the number of errors or types of errors detected between the user entered code and the true code.

5. The method of claim 1, wherein one or more of the number of errors and types of errors detected between the user entered code and true code are recorded.

6. The method of claim 1, wherein the step of verifying the true code comprises verification of the true code only when one or more of the number or errors and type of errors is below a predetermined threshold.

7. The method of claim 1, wherein all code characters are contained within one or more subsets.

8. The method of claim 1, wherein all subsets contain only two code characters.

9. The method of claim 1, wherein each error has an associated probability score and correction of the one or more errors detected in a user entered coded is completed based upon the probability score associated with the one or more errors detected and only correcting the code if the probability score of the correction is above a pre-defined threshold.

10. The method of claim 1, wherein the probability score associated with an erroneous user entered character is influenced by the characters that are next to the erroneous user entered character.

11. The method of claim 1, wherein two sequentially user entered characters are detected as errors and correction of both characters is made by transposing the two sequentially user entered characters detected as errors, resulting in the characters being correct as compared to the true code, whether or not the probability score of correcting either error is above a pre-defined threshold.

12. A system for verifying that a user code entered into a computing system matches a true code, the system comprising a computerized processor configured for executing instructions for:
    defining a set of code characters that can be used in a product identity code;
    defining one or more subsets of the set of code characters, each of the subsets comprising two or more predefined identification equivalents of the set of code characters, each subset having a predetermined subset identifier;
    defining a transformation for generating an identity of a true code based on the predetermined subset identifier;
    receiving a user entered code, comprising receiving a set of one or more code characters entered by a user for the purpose of verifying a product;
    deciphering the user entered code by application of the transformation to obtain an identity of the user entered code;
    generating the identity of the true code;
    comparing the user entered code and the true code, wherein the step of comparing further comprises one or more of determining the number of errors and types of errors detected between the user entered code and the true code;
    assigning a character from the set of code characters a first content probability score associated with physical proximity to another character from the set of code characters and a second content probability score associated with character similarity of the character to another character from the set of code characters;
    wherein each error has an associated content probability score;
    combining the first content probability score and the second content probability score non-linearly to create a combined probability score;
    correcting of the one or more errors detected in the user entered coded based upon the combined probability score and only correcting the user entered code if the combined probability score of the correction is above a pre-defined threshold; and
    verifying an identity of the corrected user entered code matches the identity of the true code.

13. The system of claim 12, further comprising instructions for defining a true code comprising one or more code characters derived from a product identity.

14. The system of claim 12, further comprising instructions for comparing the user code and the true code.

15. The system of claim 12, further comprising instructions for determining the number of errors or types of errors detected between the user entered code and the true code.

16. A method for verifying a code for securely identifying products produced at a production facility, comprising:
- electronically receiving configuration data from an electronic data store;
- electronically storing the configuration data for a production run, wherein the configuration data for the production run specifies parameters used in the production of products;
- transmitting the configuration data to an authorization module;
- at the authorization module:
  - determining whether the production run is authorized;
  - generating validated configuration data;
- transmitting the validated configuration data to a signature module;
- at the signature module, signing the validated configuration data;
- storing the product identifier in an electronic data store as the product identifier;
- transmitting the machine secure unique product identifier to a printer module for printing on a product;
- receiving a user entered code, comprising receiving a set of one or more code characters entered by a user for the purpose of verifying the product;
- deciphering the user entered code by application of the transformation to obtain an identity of the user entered code;
- generating an identity of the true code;
- comparing the user entered code and the true code, wherein the step of comparing further comprises one or more of determining the number of errors and types of errors detected between the user entered code and the true code;
- assigning a character from the set of code characters a first content probability score associated with physical proximity to another character from the set of code characters and a second content probability score associated with character similarity of the character to another character from the set of code characters;
- wherein each error has an associated content probability score;
- combining the first content probability score and the second content probability score non-linearly to create a combined probability score;
- correcting of the one or more errors detected in the user entered coded based upon the combined probability score and only correcting the user entered code if the combined probability score of the correction is above a pre-defined threshold; and
- verifying an identity of the corrected user entered code matches the identity of the true code.

* * * * *